United States Patent Office 3,164,459
Patented Jan. 5, 1965

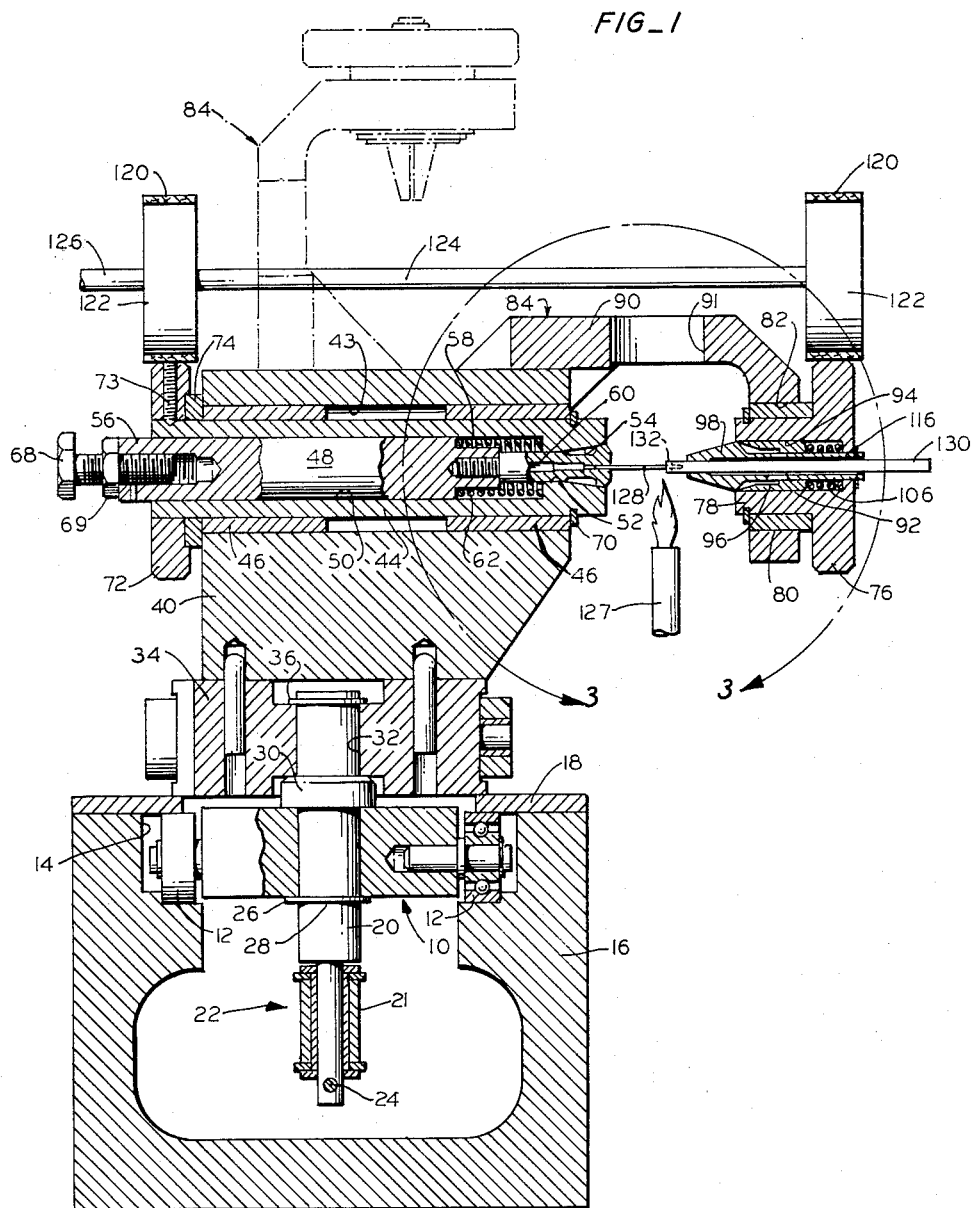

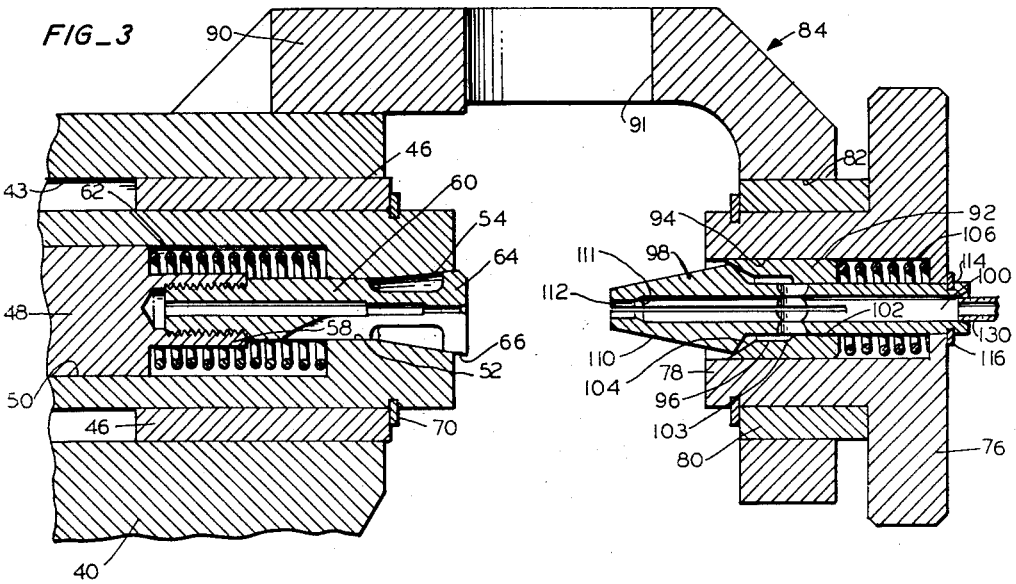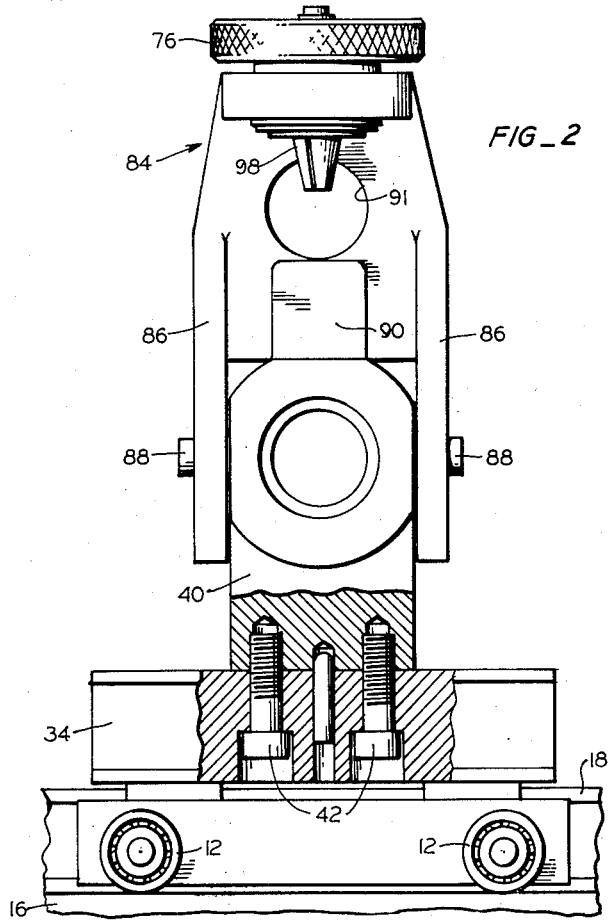

3,164,459
APPARATUS FOR ASSEMBLING ELECTRONIC PARTS
Richard R. Bower, Palo Alto, Calif., assignor, by mesne assignments, to Raytheon Company, Lexington, Mass., a corporation of Delaware
Filed May 8, 1961, Ser. No. 108,454
4 Claims. (Cl. 65—155)

This invention relates to improvements for automatically assembling two or more parts into an integral unit.

One type of industry in which the invention finds wide application is electronics, and the invention is described specifically with respect to assembling electronic components, although it is also useful for assembling parts in other industries.

One example of an electrical component made from a plurality of parts is a diode which requires the sealing of a metal wire in one end of a glass tube. The wire and glass tube are relatively small, making manual positioning and sealing of these elements tedious and expensive. The apparatus of this invention automatically sets the two parts in properly aligned position to facilitate sealing them together by the application of heat.

Preferably, the apparatus includes a body and first holding means on the body for holding a first part, say a metal wire. A head is disposed adjacent the body, and includes a second holding means for holding a second part, say a glass tube to be sealed to the wire. The apparatus also includes means for mounting the head on the body to be movable from a first position to a second position and bring the second part, or glass tube, into sealing position with the first part, or wire.

Preferably, the body and head include elongated bores which are collinear when the head is in the second position. A separate spring-loaded collet is in each bore for grapping the parts so the parts may be shifted longitudinally in the bores.

In the preferred form, the body is mounted on a carriage which has rollers adapted to ride on a track so the apparatus can automatically be moved past different stages for various operations in the assembly of the parts.

When the parts are to be fused together, as in the case of the wire and glass tube, the holding means on the body and on the head are rotatable about a common axis, and means are provided for rotating two holding means simultaneously in the same direction and at the same speed so that uniform fusing of the parts is obtained on the application of heat, say from a gas flame.

Preferably, the head is mounted to pivot on the body from the first position with the bore in the head vertically, and to a second position with the head bore horizontal and collinear with the body bore. This facilitates automatic loading of glass tubes into the head bore, and automatic loading of the wire into the body bore.

These and other aspects of the invention will be more fully understood from the following detailed description taken in conjunction with the accompanying drawings in which:

FIG. 1 is a transverse elevation, partly broken away, of the presently preferred embodiment of the invention;

FIG. 2 is a side elevation, partly broken away, of the apparatus shown in FIG. 1, except that the head is moved up to the dotted line position shown in FIG. 1; and FIG. 3 is an enlarged view of the area of FIG. 1 enclosed by the circle 3—3.

Referring to the drawings, a carriage 10 includes four wheels 12 which roll in channels 14 of an upwardly opening, elongated track 16. The channels are covered by strips 18 to prevent the wheels from inadvertently being lifted from the track. A vertical post 20 extends from below the carriage up through the carriage and terminates above the track. A link 21 of an elongated roller chain 22 is slipped up over the lower end of the post and prevented from dropping off by a transverse pin 24. The chain is driven by any suitable means, such as a sprocket (not shown), to move the carriage along the track. A snap ring 26 fits in a groove 28 around the vertical post and bears against the bottom of the carriage to hold it up firmly against the underside of an annular boss 30 formed integrally with the post, the upper end of which extends up through a vertical stepped bore 32 in a horizontal block 34, which includes horizontal transverse indexing holes on opposite sides to receive indexing pins (not shown) at different positions along the track to hold the carriage in an accurately fixed position with respect to the track. A snap ring 36 on the upper end of the post holds the block down on the annular boss. A body 40 is secured by screws 42 to the top of the block, and includes a transverse horizontal bore 43 extending all the way through it.

A rotatable sleeve 44 is journaled in bushings 46 press-fitted in the body bore 43. The sleeve includes a stepped bore 48 extending all the way through it. The bore 48 includes a relatively long and relatively large diameter section 50 which extends from the left (as viewed in FIG. 1) end of the sleeve to terminate adjacent the right end of the sleeve in a reduced section 52, which includes an outwardly tapered section 54 that opens out of the right end of the sleeve. A rod 56 makes a close sliding fit inside the sleeve, and projects beyond the left end of the sleeve. The right end of the rod terminates within the sleeve and includes a turned down section 58 which is internally threaded to receive the left end of a body collet 60 coaxially disposed within the sleeve bore to extend out the right end of the sleeve. A compression spring 62 in the sleeve around the collet urges the rod and collet to the left (as viewed in FIG. 1). The right end of the collet is split longitudinally into three fingers 64, which each include tapered surfaces 66 at their outer ends to fit against the tapered section 54 of the sleeve bore. Thus, the fingers tend normally to spring open but are urged together by the spring 62 forcing the collet to the left.

An adjusting screw 68 is screwed into the left end of the rod 56 and held in a fixed position by a jam nut 69 so that the effective length of the rod can be varied for a purpose described below.

The sleeve is prevented from sliding longitudinally in the bushings 46, by a snap ring 70 at the right end of the sleeve and a disk 72 secured by a set screw 73 to the left end of the sleeve just outside a spacer washer 74 disposed around the sleeve to bear against the outer end of the left bushing.

A circular head 76 includes hub 78 journaled in a bushing 80 press-fitted in a bore 82 through one end of an inverted generally U-shaped arm 84. The other end of the arm includes a pair of laterally spaced links 86 which are each journaled on separate respective horizontal and longitudinally extending stub shafts 88 on opposite sides of the body so the head and arm can be pivoted between the solid and dotted line positions shown in FIG. 1. A transverse stop bar 90 is formed integrally with the arm to extend between the two links and accurately stop the head in the two positions. The stop bar 90 includes a circular opening 91 to permit the dissipation of heat as described below.

A head sleeve 92 makes a slip fit in the left end of a stepped bore 94 which extends all the way through the circular head and hub. The sleeve 92 includes a stepped bore 96 (see FIG. 3) to receive a head collet 98 which has a longitudinal bore 100 extending all the way through it. As shown best in FIG. 3, the stepped bore in the sleeve 92 includes a first section 102 at its right end, a larger intermediate section 103, and an outwardly flaring section 104 at its left end. A compression spring 106 is disposed in the right end of the head bore 94 coaxially around the head collet to urge the head sleeve to the left so that the flared section 104 of the sleeve tends to squeeze together three longitudinally extending fingers 110 at the left end of the head collet. As shown best in FIG. 3, the bore 100 in the head collet is stepped down through a short tapered section 111 to a straight section 112 of reduced diameter. The right end of the collet includes an annular groove 114 to receive the snap ring 116 that prevents the compression spring from ejecting the head sleeve and collet from the head.

Referring to FIGS. 1 and 2, a pair of horizontal, laterally spaced, and longitudinally extending endless belts 120 are each disposed around a respective pair of rollers 122. Only one roller of each pair is shown. The rollers at adjacent ends of the belts are mounted to rotate together on common shafts 124. A drive shaft 126 is connected to one of the rollers so the belts are driven together and at the same rate of speed from a common power source (not shown).

As shown best in FIG. 1, the belts are located to engage the top of the disk 72 and the circular heads 76 as the carriage is moved along the track into a fusing stage which includes a gas burner 12 located adjacent the track.

In using the apparatus to seal a wire 128 (FIG. 1) to a glass tube 130, the apparatus is positioned on the track as shown in FIG. 2, i.e., with the head up so the head collet is vertical. The glass tube is dropped into the bore 100 of the head collet. The O.D. of the glass tube is slightly less than the I.D. of the bore 100, which is flared outwardly to facilitate the entry of the tube into the bore. The lower end of the tube comes to rest on the shoulder formed by the reduced section 112.

A horizontal wire is inserted into the bore collet by pressing in rod 56 so that it moves to the right (as viewed in FIG. 1), causing the spring 62 to compress, and permitting the body collet to move to the right so the fingers expand outwardly. The wire is slipped into the open fingers. Thereafter, pressure is removed from the rod so that it is returned by the compression spring to the position shown in FIG. 1, thereby clamping the wire firmly in the body collet. The right end of the wire projects a substantial distance from the body collet and has a glass bead 132 sealed to it.

The head is swung clockwise (as viewed in FIG. 1) gently until the stop 90 comes to rest on top of the body and aligns the two collets to be collinear. The glass tube is then pushed to the left by a suitable tool (not shown). The left end of the glass forces its way past the tapered section 111 in the head collet, forcing the fingers 110 to spread and drive the sleeve 92 slightly to the right against the action of the compression spring 106. Movement of the glass tube is continued until the left end of the glass tube is around the glass bead as shown best in FIGS. 1 and 3. Movement of the tube is stopped, and it is held firmly in place by the head collet which is urged to the left by its compression spring. The tube pushing tool is withdrawn.

Thereafter, the carriage is moved forward (to the right as viewed in FIG. 2) to bring the belts 120 into engagement with the top portions of the disk and circular head, thereby causing the collets to rotate together in the same direction and at the same rate of speed. Movement of the carriage under the belt is continued until the glass bead 132 and glass tube are over the flame of the glass burner 127. The belts 120 are rotated continuously as the carriage moves the wire bead and tube over the flame, which causes the glass bead and tube to fuse together. The carriage is stopped with the work over the flame, but the belts 120 continue to move so that the work is rotated during the fusing operation.

After the fusing operation, the carriage is moved further to the right to permit the fused joint to cool. The body collet is again opened by pressing in on rod 56 and the fused assembly is pushed to the left by a suitable tool (not shown) until the right end of the glass tube is free of the head collet. The tool is then withdrawn from the head collet and the head is rotated counter-clockwise back to the dotted line position shown in FIG. 1. The body collet is opened, and the assembled unit is removed so the cycle can be repeated.

I claim:

1. Apparatus for connecting separate parts together by the application of heat, the apparatus comprising an elongated track, a source of heat adjacent the track, a movable carriage mounted on the track, a body mounted on the carriage, first holding means on the body for holding a first part, a head spaced from the body, second holding means on the head for holding a second part, means mounting the head on the carriage to be movable from a first position to a second position and bring the second part into connecting position with the first part, means for rotating the two parts in the connecting position simultaneously in the same direction and at the same speed, and means for moving the carriage along the track relative to the source of heat to move the two parts in the connecting position into heat transfer relationship with the heat source.

2. Apparatus for connecting separate parts together by the application of heat, the apparatus comprising an elongated track, a source of heat adjacent the track, a movable carriage mounted on the track, a body mounted on the carriage, first holding means on the body for holding a first part, a head spaced from the body, second holding means on the head for holding a second part, means mounting the head on the carriage to be movable from a first position to a second position and bring the second part into connecting position with the first part, means for rotating the two parts in the connecting position simultaneously in the same direction and at the same speed about an axis transverse to the track, and means for moving the carriage along the track relative to the source of heat to move the two parts in the connecting position into heat transfer relationship with the heat source.

3. Apparatus for connecting separate parts together by the application of heat, the apparatus comprising an elongated track, a source of heat adjacent the track, a movable carriage mounted on the track, a body mounted on the carriage, first holding means on the body for holding a first part, a head spaced from the body, second holding means on the head for holding a second part, means mounting the head on the carriage to be movable from a first position to a second position and bring the second part into connecting position with the first part, means for rotating the two parts in the connecting position simultaneously in the same direction and at the same speed, and means for moving the carriage along the track relative to the source of heat to move the two parts in the connecting position into heat transfer relationship with the heat source and out of heat transfer relationship with the heat source.

4. Apparatus for connecting separate parts together by the application of heat, the apparatus comprising an elongated track, a source of heat adjacent the track, a movable carriage mounted on the track, a body mounted on the carriage, first holding means on the body for holding a first part, a head spaced from the body, second holding means on the head for holding a second part, means mounting the head on the carriage to be pivotable about an axis extending in the same general direction as the track so the head is movable from a first position to a second position and bring the second part into connecting position with the first part, means for rotating the two parts in the connecting position simultaneously in the same direction and at the same speed about an axis transverse to the track, and means for moving the carriage along the track relative to the source of heat to move the two parts in the connecting position into heat transfer relationship with the heat source.

References Cited by the Examiner

UNITED STATES PATENTS

| | | | |
|---|---|---|---|
| 1,912,405 | 6/33 | Ronci | 65—154 |
| 1,977,638 | 10/34 | Knox | 65—138 |
| 2,244,291 | 6/41 | Eastus | 65—152 |
| 2,671,986 | 3/65 | Wiener | 65—153 |

DONALL H. SYLVESTER, *Primary Examiner.*